United States Patent
Bröcker et al.

(10) Patent No.: US 9,769,245 B2
(45) Date of Patent: Sep. 19, 2017

(54) METHOD FOR COMMUNICATING DATA BETWEEN A DOMESTIC APPLIANCE AND A USER TERMINAL, A DOMESTIC APPLIANCE, AND A SYSTEM COMPRISING A DOMESTIC APPLIANCE AND A USER TERMINAL

(71) Applicant: BSH BOSCH UND SIEMENS HAUSGERATE GMBH, München (DE)

(72) Inventors: David Bröcker, Regensburg (DE); Jens Clauss, Regensburg (DE)

(73) Assignee: BSH Hausgeraete GmbH, Munich (DE)

( * ) Notice: Subject to any disclaimer, the term of this patent is extended or adjusted under 35 U.S.C. 154(b) by 101 days.

(21) Appl. No.: 14/373,143

(22) PCT Filed: Dec. 27, 2012

(86) PCT No.: PCT/EP2012/076984
§ 371 (c)(1),
(2) Date: Jul. 18, 2014

(87) PCT Pub. No.: WO2013/107604
PCT Pub. Date: Jul. 25, 2013

(65) Prior Publication Data
US 2014/0379860 A1 Dec. 25, 2014

(30) Foreign Application Priority Data
Jan. 19, 2012 (DE) .................... 10 2012 200 714

(51) Int. Cl.
*G06F 15/16* (2006.01)
*H04M 11/04* (2006.01)
(Continued)

(52) U.S. Cl.
CPC .............. *H04L 67/10* (2013.01); *G05B 15/02* (2013.01); *H04L 12/2823* (2013.01);
(Continued)

(58) Field of Classification Search
CPC ..... H04L 12/28; H04L 12/281; H04L 12/282; H04L 12/2809; H04L 12/2818;
(Continued)

(56) References Cited

U.S. PATENT DOCUMENTS

2002/0062365 A1   5/2002  Nishikawa et al.
2002/0165953 A1*  11/2002  Diong ................. H04L 12/2602
                                                         709/224
(Continued)

FOREIGN PATENT DOCUMENTS

CN    101135903 A    3/2008
CN    101141336 A    3/2008
(Continued)

OTHER PUBLICATIONS

International Search Report for PCT/EP2012/076984, mailed May 29, 2013.
(Continued)

*Primary Examiner* — Farzana Huq
(74) *Attorney, Agent, or Firm* — Laurence A. Greenberg; Werner H. Stemer; Ralph E. Locher

(57) ABSTRACT

The invention relates to a method for communicating data between a domestic appliance and a user terminal of a user of said domestic appliance. In the course of said data communication, control data comprising control commands are transmitted to the domestic appliance, and/or status data comprising information on a current state of the domestic appliance are transmitted from the domestic appliance to the user terminal. The data communication between the domestic appliance and the user terminal takes place at least partially over the Internet, via an Internet server.

9 Claims, 1 Drawing Sheet

Figure 1:
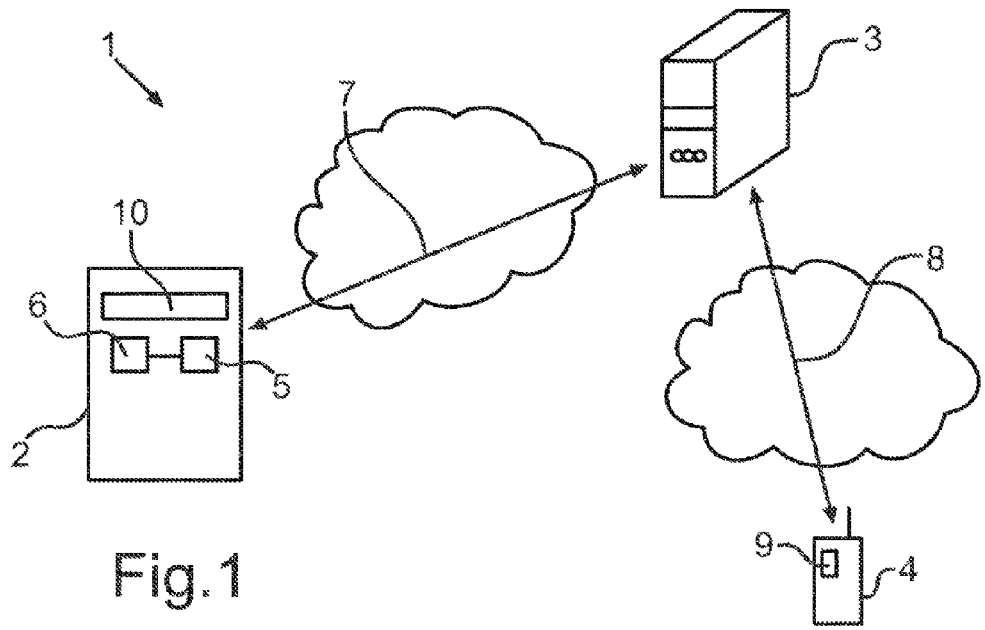

(51) Int. Cl.
*H04M 3/00* (2006.01)
*H04W 4/00* (2009.01)
*H04L 29/08* (2006.01)
*H04L 12/28* (2006.01)
*G05B 15/02* (2006.01)

(52) U.S. Cl.
CPC .............. *G05B 2219/31422* (2013.01); *G05B 2219/32126* (2013.01); *H04L 2012/285* (2013.01)

(58) Field of Classification Search
CPC ............. H04L 12/2823; H04L 12/2825; H04L 67/025; H04L 67/10; H04L 67/097; H04L 67/125; H04L 2012/2841; H04L 29/08
USPC ..... 709/203, 208, 217, 219; 455/404.1, 420, 455/466
See application file for complete search history.

(56) References Cited

U.S. PATENT DOCUMENTS

| | | | | |
|---|---|---|---|---|
| 2004/0092282 | A1* | 5/2004 | Kim | H04L 12/2803 455/522 |
| 2005/0162273 | A1* | 7/2005 | Yoon | G05B 19/0421 340/539.14 |
| 2007/0197236 | A1* | 8/2007 | Ahn | H04L 12/2809 455/466 |
| 2008/0064395 | A1* | 3/2008 | Sibileau | G08C 17/02 455/433 |
| 2011/0105041 | A1* | 5/2011 | Maruyama | G08C 17/02 455/66.1 |
| 2011/0138058 | A1* | 6/2011 | Ishida | H04L 12/4633 709/227 |
| 2011/0252071 | A1* | 10/2011 | Cidon | G06F 17/30174 707/802 |
| 2012/0124401 | A1 | 5/2012 | Bosen et al. | |
| 2013/0052946 | A1* | 2/2013 | Chatterjee | H04W 4/008 455/41.1 |

FOREIGN PATENT DOCUMENTS

| | | |
|---|---|---|
| CN | 101510091 A | 8/2009 |
| CN | 101763101 A | 6/2010 |
| CN | 202111740 U | 1/2012 |
| CN | 102474098 A | 5/2012 |
| DE | 10 2007 025004 | 1/2008 |

OTHER PUBLICATIONS

Written Opinion of the ISA for PCT/EP2012/076984, mailed May 29, 2013.

\* cited by examiner

METHOD FOR COMMUNICATING DATA BETWEEN A DOMESTIC APPLIANCE AND A USER TERMINAL, A DOMESTIC APPLIANCE, AND A SYSTEM COMPRISING A DOMESTIC APPLIANCE AND A USER TERMINAL

This application is the U.S. national phase of International Application No. PCT/EP2012/076984 filed 27 Dec. 2012 which designated the U.S. and claims priority to DE Patent Application No. 10 2012 200 714.8 filed 19 Jan. 2012, the entire contents of each of which are hereby incorporated by reference.

The invention relates to a method for communicating data between a domestic appliance on the one hand and a user terminal of a user of said domestic appliance on the other hand, wherein in the course of said data communication, control data comprising control commands is transmitted from the user terminal to the domestic appliance and/or status data comprising information on a current state of the domestic appliance is transmitted from the domestic appliance to the user terminal The invention also relates to a domestic appliance for carrying out a method of this kind, and to a system comprising a domestic appliance and a user terminal.

It is already prior art to control a domestic appliance—for instance a washing machine or a tumble dryer—with the aid of an appliance that is separate from the domestic appliance, namely with the aid of a computer by way of example. Document US 20040010327 A1 by way of example therefore describes a system comprising a domestic appliance and a computer that is separate from the domestic appliance. Both the computer and the domestic appliance are connected to a local data network in the household which is in turn connected by a gateway to the Internet. The domestic appliance is controlled here by way of the local data network, wherein an interface is downloaded from a server for this purpose. The user interface then enables the domestic appliance to be controlled by way of the local data network. A procedure of this kind is relatively complex because an additional gateway has to be provided which translates the Internet protocol into the communications protocol of the local data network. It is also not possible to control the domestic appliance from outside of the local data network therefore.

If the gateway is again omitted then one particular challenge lies in enabling secure data communication, which is protected against third-party interventions, between the domestic appliance on the one hand and the user terminal on the other.

It is the object of the invention to disclose a solution as to how in a method of the type described in the introduction data communication between the domestic appliance and the user terminal can be protected particularly securely against third-party interventions.

This object is achieved according to the invention by a method, by a domestic appliance and by a system having the features according to the respective independent claims.

Advantageous embodiments of the invention are the subject matter of the dependent claims, description and figures.

An inventive method is configured for data communication between a domestic appliance on the one hand and a user terminal of a user of said domestic appliance on the other hand. In the course of data communication, control data comprising control commands is transmitted from the user terminal to the domestic appliance and/or status data comprising information on a current state of the domestic appliance is/are transmitted from the domestic appliance to the user terminal. The data communication takes place at least partially—in particular completely—over the Internet. It is provided that the data communication between the domestic appliance and the user terminal occurs via an Internet server.

The inventive effect is therefore achieved in that the data communication between the domestic appliance on the one hand and the user terminal on the other hand is not performed directly between the two appliances, but through the medium of a server. An Internet server of this kind can be by way of example a separate host server belonging to the manufacturer of the domestic appliance. It may alternatively also be provided that the server is what is known as a cloud server which is operated and supplied independently of the appliance manufacturer. The inventive procedure enables particularly secure and reliable data communication between the domestic appliance and the user terminal or particularly secure remote control of the domestic appliance with the aid of the user terminal and/or particularly secure remote monitoring of the current state of the domestic appliance. The data communication can namely be protected particularly effectively against third-party interventions by the Internet server, so remote control of the domestic appliance and/or remote monitoring of the domestic appliance can be carried out particularly securely, even from outside of the household. The Internet server can coordinate all of the data communication between the domestic appliance and the user terminal and interrupt data communication at any time after unauthorized access has been detected.

The user terminal can basically be any terminal belonging to the user. It has proven to be particularly advantageous in this connection if the user terminal is taken to mean a portable communications device belonging to the user, such as a mobile phone (smartphone), notebook or another portable or mobile computing device. Use may therefore be made of the fact that there is a large number of very different portable communications devices available on the market which have a relatively high computing power and also enable communication over the Internet. A device belonging to the user that is already available can be used to control the domestic appliance over the Internet, namely his mobile phone by way of example. For this purpose it is possible to just install a new application by way of example on the user terminal, and this then enables communication with the Internet server and hereby with the domestic appliance, or the user can use a browser already pre-installed on any smartphone anyway to log on to the Internet server and transmit the control data to the domestic appliance and/or retrieve the status data via the Internet server.

As already stated, control data and/or status data can be transmitted in the course of data communication. Whereas the control data is transmitted from the user terminal via the Internet server to the domestic appliance, the status data is transmitted from the domestic appliance via the Internet server to the user terminal and therefore to the user. The control data can be control commands, on the basis of which by way of example an operating program of the domestic appliance is selected and/or an operating process of the domestic appliance is started in accordance with a selected program and/or an operating process that has already started is interrupted or ended. The status data by contrast can include information on the current status of the domestic appliance, such as information on the remaining time of an operating process that has begun and/or information on the current operating program and/or information on a current operating temperature and the like.

In the present case a domestic appliance is taken to mean an appliance which is used for housekeeping. This may be by way of example a large domestic appliance, such as a washing machine, tumble dryer, dishwasher, cooking appliance, extractor hood, refrigerator, fridge-freezer or an air conditioning unit. This may, however, also be a small domestic appliance, such as a fully automatic coffee machine or a food processor. The domestic appliance is in particular taken to mean a program-controlled appliance whose operating processes are carried out in accordance with stored operating programs. It has proven to be particularly advantageous if the domestic appliance is an appliance for caring for laundry or an appliance for preparing food or an appliance for cleaning dishes or an appliance for storing food at pre-defined temperatures.

If communication takes place via the Internet server then two different embodiments are accordingly expediently possible: firstly a web page in the form of an HTML code can be stored on the Internet server, and the user can retrieve this on his user terminal. Remote control and/or remote monitoring of the domestic appliance then takes place via this web page, namely in particular with the aid of operating elements provided on the web page. This web page stored on the server constitutes a user interface for remote control and/or remote monitoring of the domestic appliance here. All that is needed is for a browser to be installed on the user terminal in the case of this embodiment. Secondly, a specific application can be installed on the user terminal, and this provides a user interface on the user terminal and enables communication with the server. Neither the user interface nor the software for remote control and/or remote monitoring have to be provided by the domestic appliance and are instead stored on the server and/or the user terminal.

Data communication between the domestic appliance and the user terminal takes place particularly preferably in accordance with the Internet protocol. This means that the control data and/or the status data is/are generated by the respective appliance—domestic appliance or user terminal—in accordance with the Internet protocol. The domestic appliance can therefore send status data generated in accordance with the Internet protocol and receive control data generated in accordance with the Internet protocol. By contrast, the user terminal can receive domestic appliance status data generated in accordance with the Internet protocol, and generate and send control data in accordance with the Internet protocol. This embodiment has the advantage that an additional gateway, as is used in the prior art for translating the communications protocols, can be omitted. The domestic appliance can therefore be connected or tied directly to the Internet and the data no longer has to be transmitted via a gateway. Unlimited messages can therefore be transmitted because the data sent/received by the domestic appliance no longer has to be "translated" by means of a gateway, so the constant updating of the gateway on the basis of new functionalities or new messages becomes superfluous. For this purpose the domestic appliance can be fitted with a corresponding communications unit via which the domestic appliance can be connected to the Internet. This communications unit can be connected by way of example to a local network, in particular a LAN. The communications unit can be constructed for wired sending and receiving of data generated in accordance with the Internet protocol. In a preferred embodiment an interface is used, however, which is constructed for wireless sending and receiving of data, namely for example Wi-Fi (WLAN).

Security during message transmission can be maximized by registering the domestic appliance in the Internet server before data communication is even carried out. It is therefore always known in the Internet server which domestic appliance is participating in the data communication, so unauthorized accesses may also be prevented.

It has proven to be particularly advantageous in this connection if, after an Internet connection has been established between the domestic appliance and the Internet server or after the domestic appliance has been connected to the Internet, registration occurs independently or automatically by way of the domestic appliance. This means in particular that registration of the domestic appliance can occur independently of the user, i.e. without the user having to register his domestic appliance himself. On the one hand this embodiment is particularly user friendly because the user does not have to make any specific inputs and on the other hand this embodiment also provides for reliable registration of the domestic appliance in the Internet server, and false registrations can be prevented.

The domestic appliance can be registered by way of example such that a mark uniquely characterizing the domestic appliance, in particular a MAC address of the domestic appliance, is transmitted from the domestic appliance to the Internet server and, more precisely, in particular automatically by the domestic appliance. A predetermined password, namely a PIN or the like by way of example, can then also be transmitted from the domestic appliance to the Internet server. The domestic appliance can also be registered by transmitting a digital certificate. All of this information is received by the Internet server and the Internet server can check whether the transmitted mark and/or the password and/or the digital certificate is/are correct or not. Following successful checking the Internet server can enable data transfer; if registration has failed, by contrast, data communication can be prevented. In the event of successful registration there is therefore information in the Internet server on the sign on the one hand—for instance the MAC address and/or a serial number—of the domestic appliance, and on the other hand there is also information on the password in the Internet server.

To prevent unauthorized access the user can also be registered in the Internet server. In particular the user can have his own account on the Internet server which is protected by a password determined by the user. It is therefore possible for only the user to be able to access the Internet server and undertake remote control and/or remote monitoring of the domestic appliance.

It is particularly preferred if, before data communication between the domestic appliance and the user terminal can be carried out, the user is allocated to the domestic appliance in the Internet server. This means that the registered domestic appliance is assigned to the user, so data communication between the user terminal and the domestic appliance via the Internet server is enabled. This embodiment is based on the fact that registration of the domestic appliance and registration of the user alone are not sufficient for successful data communication between the user terminal and the domestic appliance. Instead there must also be an assignment of the registered user to the registered domestic appliance in the Internet server. This may be by way of example such that, following successful logging-on to the Internet server (a specific Internet page and/or a special application can be provided here by way of example), the user is shown a plurality of domestic appliances that have been allocated to him and with which data communication can take place. The user can choose one of these domestic appliances and transmit by way of example the control data to this selected domestic appliance.

Allocation of the user to the domestic appliance preferably includes a mark uniquely characterizing the domestic appliance, in particular said MAC address of the domestic appliance and/or its serial number, being input by the user at the user terminal and this mark then being transmitted from the user terminal to the Internet server. In addition or alternatively the user can also enter a password at the user terminal which is then transmitted from the user terminal to the Internet server. All of this data can be provided by way of example on a housing of the domestic appliance or be indicated in the operating instructions. A unique allocation of the domestic appliance to the user can therefore occur, and this takes place in a particularly secure—namely password-protected—manner, moreover.

The situation may also occur where there is already an allocation of the domestic appliance to another (earlier) user in the Internet server. There may be an earlier allocation by way of example because the user acquired the domestic appliance as a used appliance. In one embodiment the new user is therefore given the option of discarding this old allocation, so the domestic appliance can be assigned to the new user in the Internet server. It may also be provided that, before allocation of the user to the domestic appliance, an existing allocation of the domestic appliance to another user in the Internet server is discarded. The old allocation is preferably discarded on the basis of a user input, namely in particular at the domestic appliance. A reset operating element in particular can be provided on the domestic appliance which, when activated, sends data from the domestic appliance to the Internet server, on the basis of which the already out-of-date allocation is deleted. To prevent undesired deletion of this allocation it may be provided that the user has to keep this reset operating element pressed for a predetermined period—for instance 3 or 4 or 5 or 6 seconds, in order that the data is transmitted to the Internet server.

If, by contrast, the out-of-date allocation is not deleted then the new allocation is preferably also prevented. In one embodiment it is namely provided that, before the allocation of the domestic appliance to the new user, it is checked in the Internet server whether there is an existing allocation to another user, and the allocation to the new user is made only provided that there is no existing allocation. The allocation to the new user can therefore only occur if no assignment to another user is found. A procedure of this kind is particularly secure and prevents unauthorized third parties from being able to access the data.

The allocation to the user can also only take place if the user inputs a confirmation with which the user confirms that he has physical access to the domestic appliance. Allocation is therefore possible only to the actual user of the domestic appliance who also has actual access to the domestic appliance or has actual ownership of the domestic appliance. Security can therefore also be maximized and unauthorized third parties can be prevented from gaining access to the appliance data.

Basically the confirmation input can be made at the user terminal if the user terminal is part of the local network. However, it has proven to be particularly advantageous if this confirmation input is made at the domestic appliance itself. The user therefore simultaneously shows that he has physical or actual access to the domestic appliance.

An inventive domestic appliance is constructed to carry out an inventive method.

An inventive system includes a domestic appliance and a user terminal, wherein in the course of data communication between the domestic appliance and the user terminal, control data comprising control commands is transmitted to the domestic appliance and/or status data comprising information on a current state of the domestic appliance is transmitted from the domestic appliance to the user terminal, and wherein the data communication can take place at least partially over the Internet. The system comprises an Internet server via which the data communication between the domestic appliance and the user terminal can take place.

The preferred embodiments, presented with reference to the inventive method, and their advantages apply to the inventive domestic appliance and the inventive system accordingly.

Further features of the invention emerge from the claims, figures and description of the figures. All of the features and combinations of features mentioned in the description above and the features and combinations of features mentioned below in the description of the figures and/or shown solely in the figures can be used not only in the combination disclosed in each case but in other combinations or alone as well.

Figure 2:
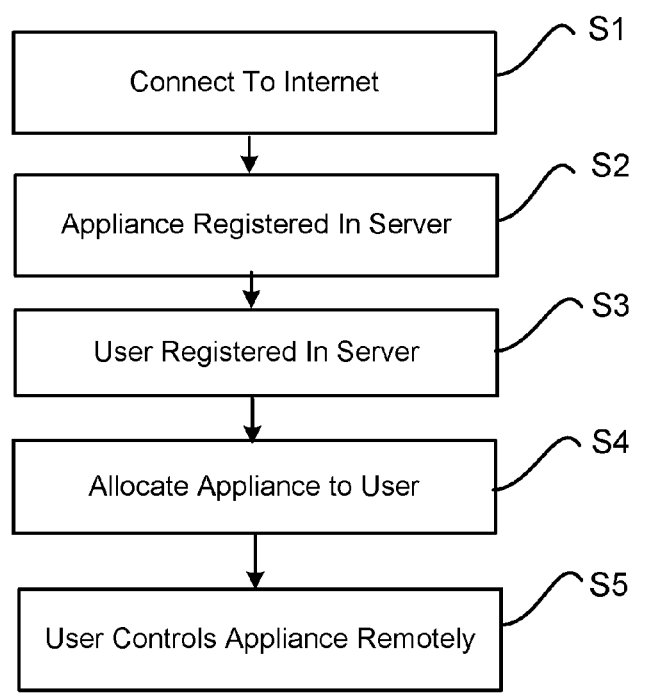

The invention will now be explained in more detail with reference to a preferred exemplary embodiment and with reference to the accompanying drawings, in which:

FIG. 1 shows in a schematic diagram a system according to one embodiment of the invention; and FIG. 2 shows a flow diagram of a method according to an embodiment of the invention.

A system 1 illustrated in FIG. 1 includes a domestic appliance 2, an Internet server 3 and a user terminal 4, namely a mobile phone by way of example. The domestic appliance 2 can be a large domestic appliance by way of example, for instance an appliance for caring for items of laundry or an appliance for preparing food, or a dishwasher. The domestic appliance 2 includes a communications unit 5 which is constructed for communication with the user terminal 4 and, more precisely, via the Internet server 3. The communications unit 5 communicates in accordance with the Internet protocol (IP) and can therefore generate data in accordance with the Internet protocol and receive and process data provided in accordance with the Internet protocol. This means that the domestic appliance 2 can be connected directly to the Internet and optionally also via an Internet router. No gateway is required therefore. The communications unit 5 is electrically coupled inside the domestic appliance 2 to a controller 6 of the domestic appliance 2 as well and can communicate with it. The controller 6 can include by way of example a microcontroller, a digital signal processor and a memory. The controller 6 can be a central control unit of the domestic appliance 2 which controls the operating processes of the domestic appliance 2, namely in accordance with stored operating programs. It is therefore the controller 6 which communicates via the communications unit 5 with the server 3.

The Internet server 3 is by way of example a server computer which is provided by a manufacturer of the domestic appliance 2. This Internet server 3 is also connected to the Internet, so an Internet connection 7 can be established between the Internet server 3 and the domestic appliance 2. A corresponding Internet connection 8 can also be established between the Internet server 3 and the user terminal 4. This can be such that the server 3 coordinates communication between the user terminal 4 and the domestic appliance 2, so the domestic appliance 2 and the user terminal 4 only "see" the server 3 and the server 3 conveys messages between the domestic appliance 2 and the user terminal 4.

The user terminal 4 has a corresponding communications unit 9 which is constructed for wireless communication over the Internet. The communications unit 9 can also communicate in accordance with the Internet protocol.

In the exemplary embodiment according to FIG. 1 the user terminal 4 is a mobile phone. The invention is not restricted to a specific embodiment of the user terminal 4, however. The user terminal 4 can also be other terminals, such as a notebook, PDA or the like. It is crucial only that the user terminal 4 has a communications unit 9 which is designed for communication or message transmissions over the Internet.

Data communication between the domestic appliance 2 and the user terminal 4 occurs therefore through the medium of the Internet server 3. Data communication of this kind is particularly secure and protects the domestic appliance 2 against third-party interventions and against intervention by unauthorized third parties. On the one hand status data can be transmitted from the domestic appliance 2 to the user terminal 4, and this contains information on the current state of the domestic appliance 2. This status data can include by way of example information on the remaining time which has to elapse until the end of an operating process of the domestic appliance 2. The status data can also include information on the selected operating program of the domestic appliance 2. On the other hand control data can be transmitted to the domestic appliance 2 through the medium of the Internet server 3, and this is received by the controller 6 of the domestic appliance 2. The control data can include a command on the basis of which the controller 6 of the domestic appliance 2 starts an operating process. The control data can, however, also include a control command by way of which a specific operating program is selected according to which the operating process takes place.

Different embodiments may be provided for controlling the domestic appliance 2 via the Internet server 3. Firstly a user interface—for instance in the form of a web page—can be stored in the Internet server 3, and this can be retrieved on the user terminal 4. The user only requires a browser for this purpose, and this can be installed on the user terminal 4. Secondly it is also possible to install a specific application on the user terminal 4, with which a corresponding user interface is provided on the user terminal 4. The user can then communicate via this user interface with the Internet server 3 which in turn then sends the control data to the domestic appliance 2.

A method according to an embodiment of the invention will be explained in more detail with reference now to FIG. 2. In a first step S1 the domestic appliance 2 is connected to the Internet, so the Internet connection to the Internet server 3 is established. In a subsequent step S2 the domestic appliance 2 is automatically registered in the server 3. The domestic appliance 2 automatically sends, or sends solely on the basis of the Internet connection 7, the following data to the server 3:
- a specific mark of the domestic appliance 2, namely by way of example the unique MAC address of the domestic appliance 2, and
- a predetermined password stored in the controller 6.

The server 3 checks the received data and stores it in a memory. The domestic appliance 2 is therefore registered and can be controlled via the server 3 and transmit said status data to the server 3.

In a further step S3 the user is registered on the server 3. This means that the user is identified or the user opens his own account on the server 3, and this is preferably protected by his own password. The user has his own web page on the server 3 therefore, on which all information relating to the user and all domestic appliances belonging to the user are stored. The user can control the domestic appliance 2 via his account, as well as request the status data sent from the domestic appliance 2. As already stated, two modes of operation are possible here: on the one hand the user can retrieve a web page stored in the server 3 on his user terminal 4 and log in via this web page. On the other hand an appropriate application can also be installed on the user terminal 4 which provides a user interface on the user terminal 4 via which communication with the server 3 occurs.

Before the domestic appliance 2 can be controlled remotely the domestic appliance 2 is firstly allocated to the user or his account on the server 3 in a further step S4. This is necessary because a large number of domestic appliances and likewise a large number of users may be registered on the server 3, so a corresponding assignment of each household appliance to a specific user must be made. To assign the domestic appliance 2 on the server 3 to the user, the user sends the identification characterizing the domestic appliance 2—for instance the MAC address or a serial number— to the server 3 by making a corresponding input at the user terminal 4. The user can also input a specific password, provided by way of example on the housing of the domestic appliance 2 or given in the operating instructions, at the user terminal 4 and also send this password to the server 3. The server 3 then compares the received data with the stored data of the domestic appliance 2 and assigns the domestic appliance 2 to the new user. This assignment is preferably made under the following conditions: firstly under the condition that there is no existing allocation to another user in the server 3, and secondly under the condition that the user inputs a confirmation which confirms that the user has physical access to the domestic appliance 2. This confirmation input is preferably made on a control panel 10 of the domestic appliance 2. To enable assignment of the domestic appliance 2 to the new user even when an earlier allocation exists, the user can discard the existing allocation with the aid of a control element of the domestic appliance 2. This control element can be arranged on the control panel 10 by way of example. The control element is a reset button which has to be kept pressed for a predetermined period in order that the domestic appliance 2 transmits data to the server 3, on the basis of which the existing allocation to another user is deleted. There is then nothing more to prevent assignment of the domestic appliance 2 to the new user.

Once the domestic appliance 2 has been allocated to the user it can be controlled remotely in a further step S5. For this purpose the user logs on to the server 3 by means of the user terminal 4 and brings about different control processes of the domestic appliance 2 in his account. The user can by way of example select a specific operating program of the domestic appliance 2 and start an operating process of the domestic appliance 2 in accordance with the selected program. The user can also monitor the entire operating process of the domestic appliance 2 on his user terminal 4. As already stated, the domestic appliance 2 sends status data to the server 3 which can be retrieved by means of the user terminal 4. The user can therefore be informed about which phase of the program the domestic appliance 2 is in and how much time is remaining until the operating process finishes. The user can also interrupt the operating process at any time, namely by way of example by actuating a control element provided in the user interface. With communication of this kind the user terminal 4 and the domestic appliance 2 actually only communicate with the server 3. Since the server 3 forwards or conveys the data, however, it can be said that communication occurs between the domestic appliance 2 on the one hand and the user terminal 4 on the other hand and, more precisely, through the medium of the server 3. The communications link is initialized in particular by the domestic appliance 2 and, more precisely, once the domestic appliance 2 has been switched on or activated.

LIST OF REFERENCE CHARACTERS 1 system
2 domestic appliance
3 Internet server
4 user terminal
5 communications unit
6 controller
7 Internet connection
8 Internet connection
9 communications unit
10 control panel
S1, S2, S3, S4, S5 steps

The invention claimed is:

1. A method for communicating data between a domestic appliance and a user terminal of a user of the domestic appliance, comprising the steps of:
before the data communication takes place, registering the domestic appliance in an Internet server remote from the domestic appliance, wherein registration of the domestic appliance includes: transmitting at least one of:
a mark uniquely characterizing the domestic appliance, in particular a MAC address of the domestic appliance, from the domestic appliance to the Internet server, or
a predetermined password from the domestic appliance to the Internet server;
before the data communication between the domestic appliance and the user terminal takes place, registering the user in the Internet server and allocating the user to the domestic appliance in the Internet server;
in the course of said data communication, transmitting at least one of:
control data comprising control commands from the user terminal to the domestic appliance, or
status data comprising information on a current state of the domestic appliance from the domestic appliance to the user terminal;
wherein the data communication between the domestic appliance and the user terminal takes place via the Internet server; and
wherein before the allocation of the domestic appliance to a new user, a check is made in the Internet server as to whether there is an existing allocation to another user, and the allocation to the new user is made only provided that there is no existing allocation.

2. The method as claimed in claim 1, wherein the data communication between the domestic appliance and the user terminal occurs in accordance with the Internet protocol, so the at least one of control data or status data is generated in accordance with the Internet protocol.

3. The method as claimed in claim 1, wherein after establishing an Internet connection between the domestic appliance and the Internet server, registration is independently performed by the domestic appliance.

4. The method as claimed in claim 1, wherein the allocation of the user to the domestic appliance includes: a mark uniquely characterizing the domestic appliance, in particular a MAC address of the domestic appliance, being input by the user at the user terminal and this mark being transmitted from the user terminal to the Internet server and/or a password being input by the user at the user terminal and this password being transmitted from the user terminal to the Internet server.

5. The method as claimed in claim 1, wherein before the allocation of the user to the domestic appliance, an existing allocation of the domestic appliance to another user in the Internet server is discarded owing to an input by a user, in particular at the domestic appliance.

6. The method as claimed in claim 1, wherein the allocation to the user is made only provided that the user inputs a confirmation with which the user confirms that the user has physical access to the domestic appliance.

7. The method as claimed in claim 6, wherein the confirmation is input at the domestic appliance.

8. A domestic appliance which is constructed to carry out a method for communicating data between a domestic appliance and a user terminal of a user of the domestic appliance, the domestic appliance configured to:
register the domestic appliance in an Internet server remote from the domestic appliance before the data communication takes place, wherein registration of the domestic appliance includes: transmitting at least one of:
a mark uniquely characterizing the domestic appliance, in particular a MAC address of the domestic appliance, from the domestic appliance to the Internet server, or
a predetermined password from the domestic appliance to the Internet server;
register, before the data communication between the domestic appliance and the user terminal takes place, the user in the Internet server and allocate the user to the domestic appliance in the Internet server;
transmit, in the course of said data communication, at least one of:
control data comprising control commands from the user terminal to the domestic appliance, or
status data comprising information on a current state of the domestic appliance from the domestic appliance to the user terminal;
wherein the data communication between the domestic appliance and the user terminal takes place via the Internet server; and
wherein before the allocation of the domestic appliance to a new user, a check is made in the Internet server as to whether there is an existing allocation to another user, and the allocation to the new user is made only provided that there is no existing allocation.

9. A system, comprising:
a domestic appliance; and
a user terminal;
wherein in the course of data communication between the domestic appliance and the user terminal, at least one of:
control data comprising control commands is transmitted to the domestic appliance; or
status data comprising information on a current state of the domestic appliance is transmitted from the domestic appliance to the user terminal;
an Internet server remote from the domestic appliance via which the data communication between the domestic appliance and the user terminal takes place over the Internet;

wherein, before the data communication takes place, the domestic appliance is registered in the Internet server, wherein registration of the domestic appliance includes:

transmitting at least one of:
- a mark uniquely characterizing the domestic appliance, in particular a MAC address of the domestic appliance, from the domestic appliance to the Internet server, or
- a predetermined password from the domestic appliance to the Internet server; and
- before the data communication between the domestic appliance and the user terminal takes place, the user is registered in the Internet server and the user is allocated to the domestic appliance in the Internet server; and
- wherein before the allocation of the domestic appliance to a new user, a check is made in the Internet server as to whether there is an existing allocation to another user, and the allocation to the new user is made only provided that there is no existing allocation.

* * * * *